United States Patent [19]
Bernt

[11] 3,958,411
[45] May 25, 1976

[54] SHACKLE

[76] Inventor: Jorgen O. Bernt, 1357 Amber Crescent, Oakville, Toronto, Ontario, Canada

[22] Filed: Dec. 3, 1974

[21] Appl. No.: 529,048

Related U.S. Application Data

[63] Continuation-in-part of Ser. No. 492,432, July 29, 1974, abandoned.

[52] U.S. Cl. .................................. 59/86; 59/93; 403/155
[51] Int. Cl.² ............................. F16G 15/06
[58] Field of Search .......... 59/93, 86, 85; 432/118; 403/154, 155; 74/595

[56] References Cited
UNITED STATES PATENTS

| 563,213 | 6/1896 | Tower | 59/93 |
|---|---|---|---|
| 1,285,755 | 11/1918 | McCuen | 403/155 |
| 2,847,238 | 8/1958 | Bolling | 403/154 |
| 3,497,906 | 3/1970 | McFadden | 403/155 |
| 3,738,797 | 6/1973 | Robinson | 59/93 |

FOREIGN PATENTS OR APPLICATIONS

| 281,556 | 12/1927 | United Kingdom | 59/86 |

*Primary Examiner*—C. W. Lanham
*Assistant Examiner*—Gene P. Crosby

[57] ABSTRACT

In a shackle the shackle arms are bored to receive a pin and the pin and the bore through which the pin first enters, are shaped so that a plate, initially convex toward the pin may be flattened over the end of the pin and anchor itself in recesses in the shackle to retain the pin.

10 Claims, 8 Drawing Figures

SHACKLE

This is a continuation-in-part of application Ser. No. 492,432, filed July 29, 1974, now abandoned.

This invention relates to the design of a shackle and shackle pin.

In designs of shackles and pins the shackle pin is commonly made to be slidable into place to rest in aligned bores in the shackle arms but must then be welded or otherwise fixed in position or must be held in place by a locking pin installed by the use of a wrench. Where the pin is retained by welding, the inconvenience of performing the welding operation is involved and, the shackle must be substantially destroyed to be removed, so that its use is limited to a single operation. Where a locking pin is used the expense is increased and there is the added inconvenience of providing a wrench on the site for both the assembling and dismantling of the shackle pin.

It is an object of this invention to provide a shackle and pin designed so that the pin may be simply fixed in place by impact blows by a hammer or other simple implement and where the shackle and pin may be re-used.

It is an object of the invention to provide a shackle and pin designed as stated in the previous paragraph and designed so that the pin, fixed in place, in accord with the inventive design, may be released by a simple prying operation.

It is an object of the invention to provide a shackle and pin designed to rest in aligned bores in the shackle arms. The design is such that the pin enters through the bore in one of the shackle arms and seating or stop means stop its movement through the aligned bores at its desired location therein. A curved retainer of permanently deformable metal is provided to be applied to the shackle arms where the pin first enters over the end of the pin which enters the bore last and would leave it first. The retainer is designed so that with its ends resting on a surface of the shackle or pin, impact blows on the convex surface of the retainer will straighten it across the pin end. Such surfaces are provided. The shackle arm where the retainer is applied is provided with opposed recesses located to receive the ends of the retainer when so flattened. The recesses are shaped so that when the ends of the retainer are received therein, the withdrawal of the retainer and the pin is prevented so that the retainer acts to hold the shackle pin in position.

Alternative designs are shown for providing the surfaces on which the ends of the curved retainer are braced, when the retainer is to be subjected to impact blows to straighten it.

In one alternative arrangement the shackle arm of the retainer through which the pin enters the bores, is provided about the bore with a surface transverse to the bore facing the entrance thereof. The surface is shaped so that the retainer ends may be based thereon while the retainer is straightened and as the impact blows are applied, the ends of the retainer are guided into the recesses.

In another alternative arrangement the pin is provided with an enlarged head and the shackle arm through which the pin enters the bores is provided about the bore with a recess to receive the head. The exposed surface of the enlarged head of the pin is shaped in relation to the shackle arm so that the curved retainer ends may be braced thereon and when the retainer is impacted the retainer ends are guided into the recesses.

It is an object of the invention to provide (in a preferred form of the invention) that the shackle of the previous paragraph is designed so that, with the retainer in place in the recesses, tool may be applied to the side of the retainer to pry it out of the recesses and release the pin to allow removal of the shackle.

It is an object of this invention to provide a shackle and pin where the pin, after having been locked into place, by means of a retainer, is free to rotate in the shackle to distribute wear from usage more evenly and thus extend the usable life of the shackle and pin assembly.

In drawings which illustrate a preferred embodiment of the invention;

Figure 1:
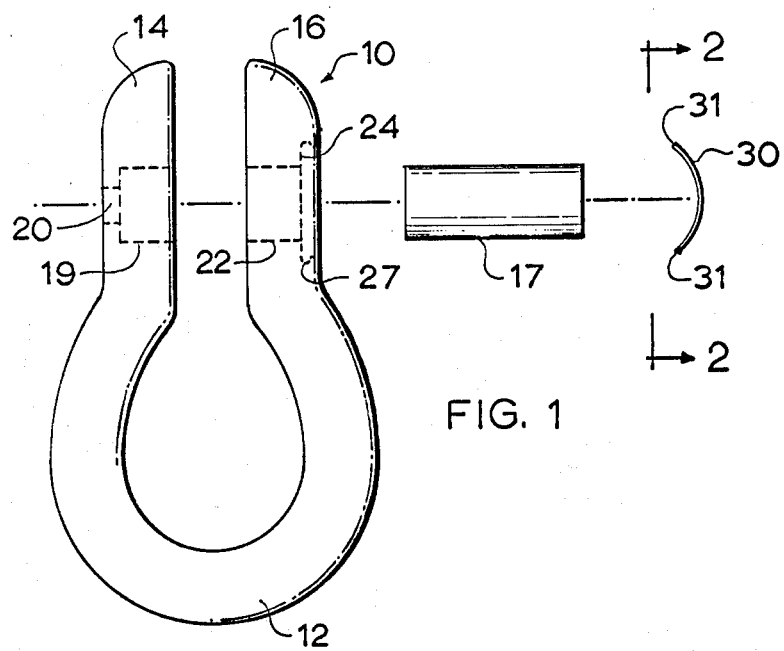
FIG. 1 shows an unassembled view of one preferred form of the shackle, pin and retainer.
Figure 2:
FIG. 2 shows a view of the retainer along the lines 2—2 of FIG. 1.

In the FIGS. 1 – 6, a shackle 10 comprises a bight 12 and a pair of arms 14 and 16 extending from the bight to adjacent free ends. The free ends are spaced sufficiently that the member to be coupled to the shackle may be passed therebetween. The shackle along with the shackle pin 17 and the retainer are all (for their most common uses) made of stainless steel. However the shackle and the pin may be made of any material structurally suited for the purpose and the retainer may be made of any permanently deformable material suited to bending to a more straitened deformable state to retain the shackle pin (it being noted that although the transverse stresses on the shackle pin are extremely large, the axial stresses which are those resisted by the retainer, are small).

On one of the arms, 14, adjacent the free end a cylindrical well or seat 19 is provided facing the other of said arms dimensioned to seat the end of a shackle pin on the surface 18. The small bore 20 leading into the well 19, from the other side, is not related to the invention and is provided to allow removal of the shackle pin 17 should it become jammed.

The other arm 16 is provided with a through bore 22, arranged so that a shackle pin will move slidably therethrough to seat in well 19. The end of bore 22 remote from member 14 is enlarged to provide an outwardly facing surface 24 which joins the bore proper to the wall 26 defining an enlarged opening. Wall 26 is shaped to define an enlarged diameter just inwardly of the outer edge so that an undercut recess 27 is provided into which may be pressed the ends of a retainer so that the outer defining walls of the undercut recess 27 will resist the removal of the retainer.

Figure 6:
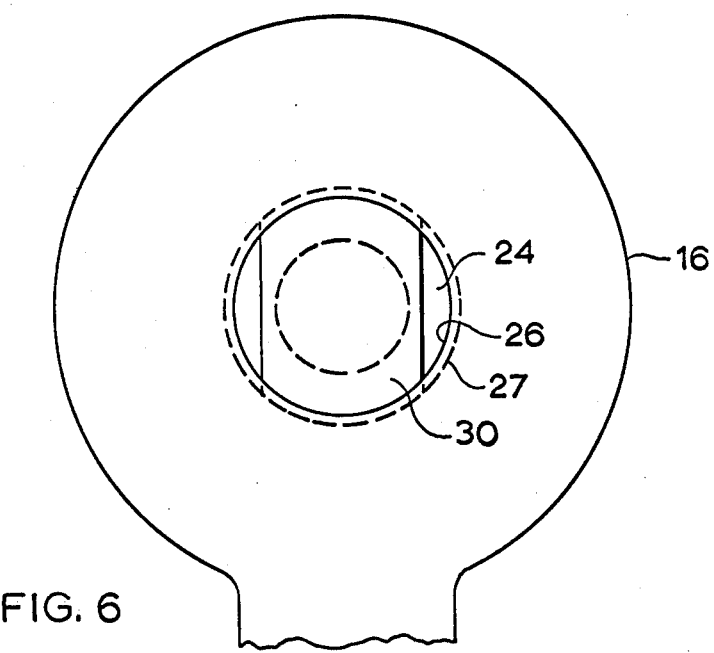
FIG. 6 shows an end view of the retainer in place.

As shown, and in its preferable form the enlarged opening and surface 26 are circular as shown in FIG. 6, as viewed in the direction of sliding of the shackle pin.

Figure 3:
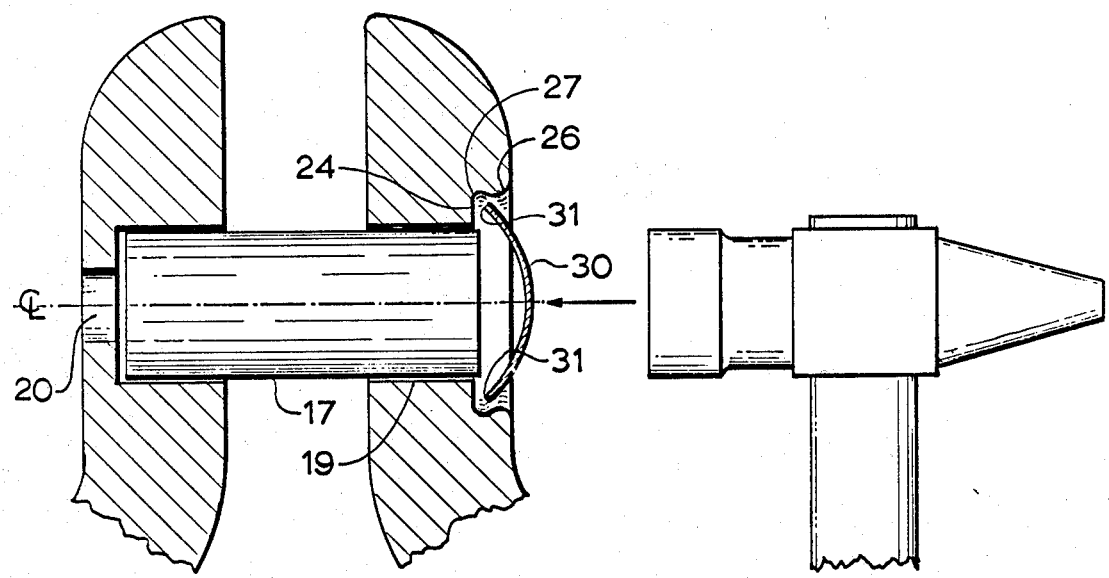
FIG. 3 shows the fixing of the retainer in place.

A curved retainer 30 is dimensioned so that in side view, as shown in FIG. 1, its ends 31 when it is concave towards the shackle pin in place are designed to contact the surface 24 on each side of the bore 22 and when it is straightened, by impact blows as indicated in FIG. 3 the retainer 30 is dimensioned so that the ends 31 thereof are received in the undercut portion of the recess and prevent the removal of the retainer, as the retainer prevents removal of the shackle pin.

Figure 5:
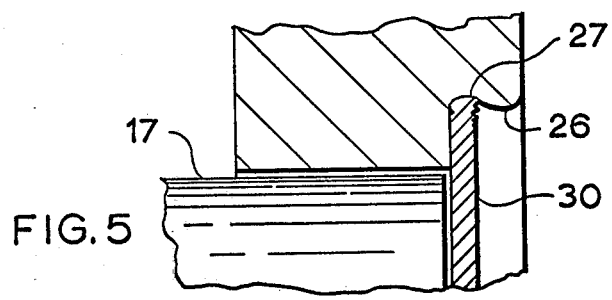
FIG. 5 shows an enlargement of the edge of the retainer, in place.

In a preferred embodiment of the invention, the ends 31 of the retainer (shown square in FIG. 3) are shaped differently from the defining surface of the undercut portion of the recess 27; and the retainer is shaped to force the ends into the differently shaped recess. The shape of the recess thus deforms the retainer ends 31 to conform, thereto, as best shown in FIG. 5. The resultant deformation holds the retainer more securely in place and provides a locking action. Where this preferred embodiment is used, the metal of the retainer must of course be softer than the metal of the shackle.

As shown in FIG. 6 the sides of the retainer 30 are parallel, forming substantial chords in the circular outline of the enlarged opening. The result is that when it is desired to remove the shackle pin 17, a screw driver or similar implement may be used to pry out the retainer 30.

Although the arrangement shown in FIG. 6 is the one preferred for allowing the easy removal, it will be realized that the invention is intended to encompass an arrangement where the retainer straightened sufficiently to have its ends 31 resting in recesses, is accessible by a prying tool.

Although a circular undercut recess into which the retainer may be pressed at any angle, is the preferred arrangement, it will be obvious that the retainer may be used with any opposed undercut recesses which will receive the retainer ends when the retainer is straightened.

Figure 4:
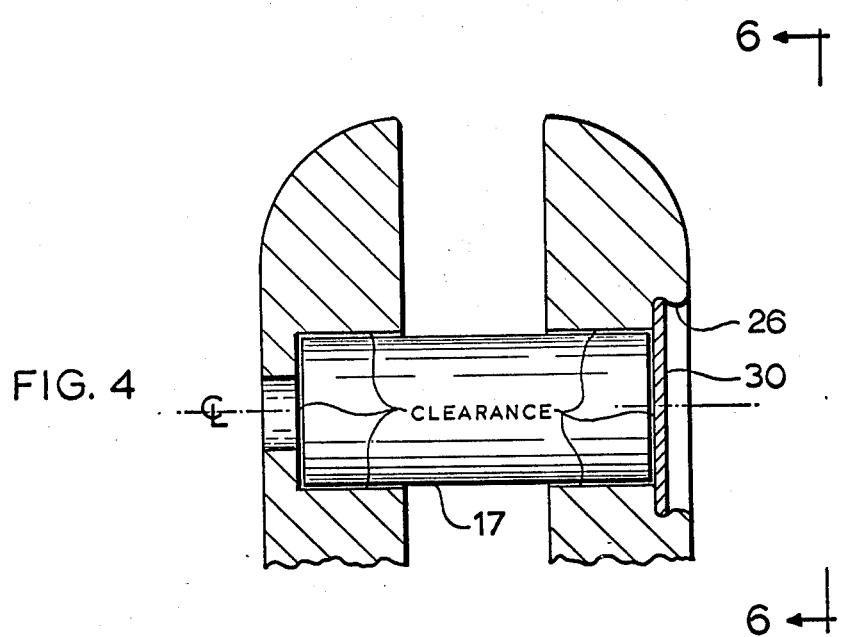
FIG. 4 shows the retainer holding the shackle pin in place.

In operation, the retainer is applied in the shape shown in FIG. 3 and flattened by impact blows until its end 31 are retained in the undercut recesses, assuring the shape shown in FIGS. 4, 5 and 6.

The retainer 30 may have much smaller strength than the pin 17 since although large loads are exerted transversely on the pin 17, the axial loads on the pin 17 and from the pin 17 to the retainer 30 are extremely small.

When it is desired to remove the retainer it may be pried out as previously described.

There is thus provided a shackle pin 17 and the retainer designed so that the retainer may be simply installed with a hammer or any blunt implement and the retainer may be removed by prying with a screw driver or similar implement. And there is provided a shackle and pin design which may be re-used an number of times although it may be necessary to replace the retainer.

FIG. 4 shows that, with the inventive design, the retainer 30 securely retains pin 17 even though pin 17 may, (as shown), be provided with clearance above, below and on each side of the pin. The pin, although securely retained, is thus free to rotate. The wear thus tends to be evenly distributed about the pin and the useful life of the pin is thereby extended. This is in contrast to the design of prior shackle pin retainers which cause the pin to be retained in a constant orientation causing constant and uneven wear.

Figure 7:
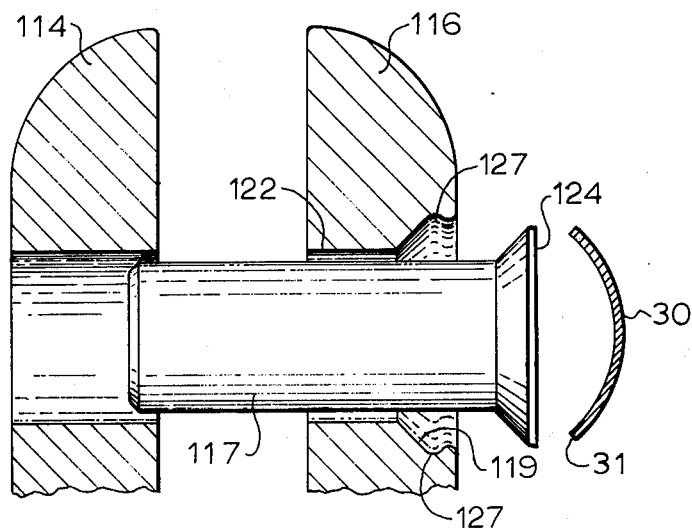
FIGS. 7 and 8 show an alternative embodiment of the invention.
Figure 8:
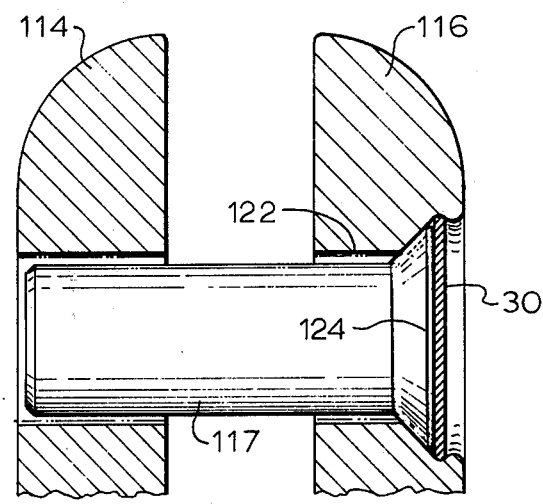

FIGS. 7 and 8 demonstrate an alternative preferred embodiment of the invention. Only the ends of the shackle arms 114 and 116 are shown since the main body of the shackle is identical to that shown in FIGS. 1 - 6. The pin 117 is provided with an enlarged head having a flat outer surface 124. The shackle arm 116 is shaped to provide a surface 119 defining an enlarged opening for bore 122 and is further designed to provide opposed undercut recesses 127 having the same form and function as recesses 27 in FIGS. 1 - 6. The shackle, recess and the pin head are designed so that with the head of pin 117 seated on surface 119 that the ends of retainer 30 (identical to that in FIGS. 1–6) will move outwardly along surface directly into the opposed recesses 127 as these ends 31 spread under the impact blows.

The retainer 30 will preferably be shaped the same as the retainer in FIGS. 1 - 6 and the opposed undercut recesses 127 preferably diametrically opposed portions of a single annulus. Thus the sides of the retainer will be chords in the circular opening of the device of FIGS. 7 and 8 as they are shown in FIG. 6 for the device of FIGS. 1–6. Thus a screw driver or similar implement may be used with the FIGS. 7–8 embodiment to pry loose the retainer 30 when it is to be removed, and the method of installation is the same as with the embodiment of FIGS. 1–6.

Some significant advantages may be noted with regard to the embodiment of FIGS. 7 and 8. The surface 124 of the head provides an unbroken guide for the retainer ends 31 until these slide into the undercut recesses 127. This may be constrasted with the first embodiment as shown in FIG. 4 where it can occur that interference will take place if the retainer end 31 in spreading catches on the edge of the bore. Secondly since the pin head effectively stops the inward travel of the pin, there is no requirement for narrowing the bore in arm 14 to act as a stop for the pin so that the bore on member 14 may be the same diameter throughout, as shown in FIGS. 7 and 8.

I claim:
1. Shackle comprising an extent of metal shaped to form a bight and provided with two arms extending from said bight and having adjacent free ends; spaced to allow the passage therebetween of a member to be coupled to said shackle,
   said two arms being shaped to provide aligned bores, whereby a shackle pin may be slid into said bores, entering initially through the bore in one of said arms,
   a shackle pin designed to be longitudinally slid into said bores and to be rotatable therein about its longitudinal axis,
   means for stopping the travel of said shackle pin into said bores when said pin is resting in both bores and extending between said arms,
   the bore in said one arm being formed with an enlarged opening at the end thereof remote from the other arm, said opening being provided with a transverse dimension increasing inwardly from the end thereof to form an undercut recess just inwardly from the end thereof, which is a surface of revolution about the said bore in said one arm,
   said one shackle arm and said pin being designed so that when said pin is resting as stopped by said stopping means, the two ends of a curved retainer inserted into said opening and concavely facing it will, when said retainer is straightened be guided into opposed portions of said undercut recess.

2. A device as claimed in claim 1 wherein the retainer is made of metal, the shackle is made of metal, the metal of the retainer is selected to be softer than the metal of the shackle and the said recess is shaped to deform the material of the said ends of the retainer.

3. A device as claimed in claim 1 wherein said shackle is combined with a retainer made of material permanently bendable under pressure, said retainer being provided in a curved form and in said curved form being dimensioned to enter said enlarged opening in an attitude concave toward said bore and dimensioned so that the forward ends may contact said transverse surface on each side of said bore, on said entry, said retainer being further formed and dimensioned so that the ends thereof may be driven into the recessed portions formed by said increased inward dimension by pressure on the convex outward side of said retainer.

4. A device as claimed in claim 3 wherein the retainer is made of metal, the shackle is made of metal, the metal of the retainer is selected to be softer than the metal of the shackle and the said recess is shaped to deform the material of the said ends of the retainer.

5. A device as claimed in claim 3 wherein said surface of revolution is dimensioned relative to said retainer to allow insertion of a tool into said opening on at least one side of said retainer.

6. A device as claimed in claim 5 wherein the retainer is made of metal, the shackle is made of metal, the metal of the retainer is selected to be softer than the metal of the shackle and the said recess is shaped to deform the material of the said ends of the retainer.

7. A shackle comprising an extent of metal shaped to form a bight and provided with two arms extending from said bight and having adjacent free ends; spaced to allow the passage therebetween of a member to be coupled to said shackle, said two arms being shaped to provide aligned bores each bordered by first defining surfaces, whereby a shackle pin may be slid into said bores, extending initially through the bore in one of said arms, means for stopping the travel of said shackle pin into said bores when said pin is resting in both bores and extending between said arms, said one of said arms being shaped to provide a second surface defining an enlarged opening for said bore on the side on which said pin enters, said second surface defining said enlarged opening extending outward from the defining first surface of said bores, transverse to the intended sliding direction of said pin in said bores said second surface being shaped to define a recess undercut relative to the entrance direction of said pin, said recess forming a surface of revolution about said bore.

8. A device as claimed in claim 7 wherein said shackle is combined with a retainer made of material permanently bendable under pressure, said retainer being dimensioned to enter said enlarged opening in an attitude concave toward said bore and dimensioned so that the forward ends may contact said second surface on each side of said bore on said entry, said retainer being further formed and dimensioned so that the ends thereof may be driven into the recess formed by said undercut portion by pressure on the convex outward side of said retainer.

9. A shackle comprising an extent of metal shaped to form a bight and provided with two arms extending from said bight and having adjacent free ends; spaced to allow the passage therebetween of a member to be coupled to said shackle, said two arms being shaped to provide aligned bores, whereby a shackle pin may be slid into said bores, extending initially through the bore in one of said arms, a shackle pin having a shank designed to slide in said bore, an enlarged head on said pin head defining an outwardly facing surface transverse to the direction of said shank, said one of said arms being shaped, to provide a surface defining an enlarged opening for said bore on the side on which said pin enters, said surface defining an enlarged opening designed to seat said enlarged head and shaped to provide opposed recesses undercut relative to the entrance direction of said pin, wherein said seating is so arranged relative to said recesses that with said head seated on said opening surface, a member moving outwardly along said head surface will be guided into said undercut recesses.

10. A device as claimed in claim 9 wherein said shackle is combined with a retainer permanently bendable under pressure, said retainer being dimensioned to enter said enlarged opening in an attitude concave toward said bore and dimensioned so that the forward ends may contact said surface on each side of said bore on said entry, said retainer being further formed and dimensioned so that the ends thereof may be driven into the undercut recesses formed by said undercut portion by pressure on the convex outward side of said retainer.

* * * * *